Patented Feb. 9, 1937

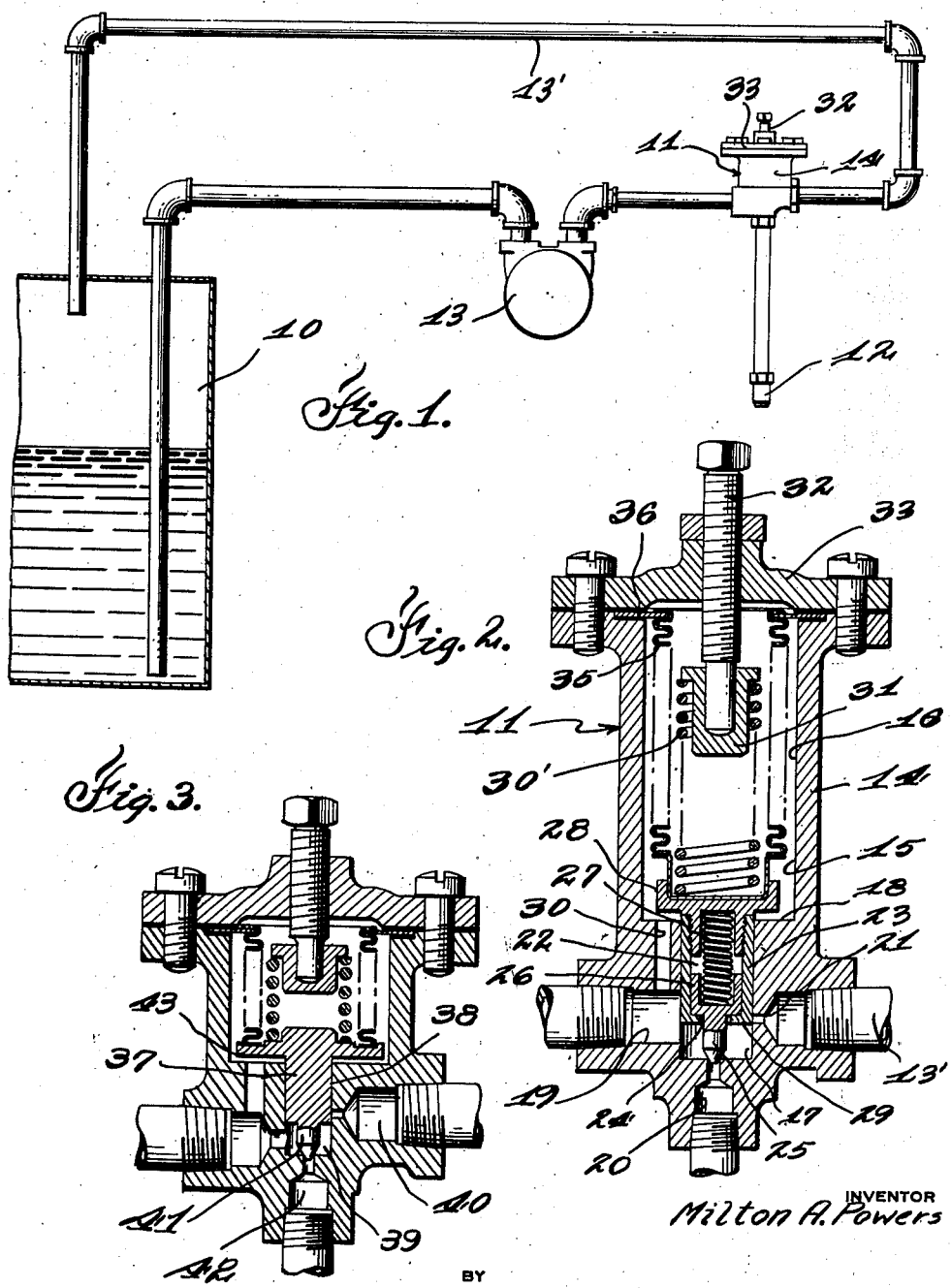

2,070,411

UNITED STATES PATENT OFFICE 2,070,411

PRESSURE REGULATOR

Milton A. Powers, Detroit, Mich.

Application August 5, 1929, Serial No. 383,491

23 Claims. (Cl. 137—153)

This invention relates to improvements in pressure regulators and has as one of its primary objects to simplify, render more efficient, and improve generally devices of this character.

The invention, while capable of many and diversified uses, finds particular utility when used in connection with oil burners for automatically maintaining a constant pressure on the fuel supplied to the burner and for completely stopping this flow at all times when the pressure is more than a predetermined amount below the desired operating pressure.

Another object of the invention is the provision of an improved pressure regulator wherein a plurality of valved ports are controlled by a single pressure responsive diaphragm or bellows in such manner that the burner port is not opened until the liquid fuel has attained the desired pressure, whereupon the burner is continuously supplied with liquid fuel at such pressure in such volume as is momentarily taken by the burner nozzle.

This is accomplished by having the same pressure responsive bellows or diaphragm which controls the burner port also control a second valve member, which regulates the opening of a by-pass port, by-passing all excess fuel and opening more or less as the volume or pressure of oil in the chamber increases or decreases.

The pressure at which the burner port opens and closes can be determined by the adjustment of the spring pressure on the bellows resisting the fluid pressure in the valve casing by means of a threaded member bearing on a spring seating member. The present valve is automatically operated responsive to pressure in the oil pipe from the pump because the intake port is always open, thereby subjecting the bellows to oil pressure at all times.

The present device is not subject to the uncertainties of operation involved in using a piston subject to the liquid pressure, as the invention contemplates the use of a diaphragm, preferably of the bellows type, which has a long range of movement and positively prevents leakage. Where a piston has a differential of pressure on its ends and is subjected to ordinary burner oil under pressure, the leakage past the piston carries particles of dirt, etc., which cause the piston to stick and become uncertain in action. It is an object of the invention to eliminate such uncertainty of action by subjecting both sides of the piston valve to the same pressure, and to provide a more dependable and positively acting automatic fuel pressure regulating valve.

This invention contemplates a pressure regulator distinguished by its simplicity of operation, and one which insures a supply of fuel to the burner under a constant predetermined pressure.

With the foregoing, as well as other objects in view, the invention consists in the novel features of construction illustrated and about to be described.

In the drawing:

Figure 1 is a diagrammatic view illustrating generally an oil burner system.

Figure 2 is a longitudinal sectional view through a pressure regulator constructed in accordance with this invention.

Figure 3 is a view similar to Figure 2 showing a slightly modified form of construction.

For the purpose of illustration, I have shown my improved pressure regulator as used in connection with an oil burner system comprising generally a supply tank 10, a pressure regulator 11 and a burner nozzle 12. For supplying fuel under pressure to the burner nozzle 12, a suitable pump 13 is provided having the intake thereof connected to the supply tank and the exhaust connected to the pressure regulator. Thus it will be apparent that the fuel in the present instance is caused to flow through a pressure regulator prior to entering the burner nozzle. An arrangement of this character renders it possible to supply fuel to the burner nozzle under a constant predetermined pressure. In the event the pressure exceeds the predetermined amount, the fuel will be automatically by-passed by the pressure regulator through the conduit 13' back to the supply tank. On the other hand, if the pressure is materially lower than the predetermined desired amount, the regulator will automatically close communication to the burner nozzle. This function is important in preventing the undesirable discharge of fuel from the nozzle at pressures which are inadequate for its proper atomization and combustion. In normal operation such inadequate pressures will be present during each starting and stopping period.

The pressure regulator in Figure 2 comprises a casing 14 forming a chamber 15 having an enlarged portion 16 and a reduced portion 17 communicating with the enlarged portion and forming an annular shoulder 18. As shown in Figure 2, the reduced portion 17 is arranged within the casing adjacent the lower end thereof and is provided with an inlet opening 19 in one wall thereof adapted to be connected to the pressure line of the system. The reduced portion 17 is also provided with an outlet opening 20 in the bottom wall thereof adapted to communicate with the oil burner 12 and is further provided with a restricted by-pass opening 21 adapted to be connected to the conduit 13' for conducting the fluid back to the supply tank. The by-pass opening 21 is preferably arranged in the side wall of the reduced portion opposite and above the intake opening 19 and substantially above the outlet opening 20.

For controlling the flow of fluid through the outlet opening 20 and the by-pass 21, I provide reciprocable valve means 22 slidably mounted within the reduced portion 17 of the chamber. The valve means comprises a sleeve-like member 23 slidably engaging the side walls of the reduced portion 17 and having a restricted opening 24 in the lower end thereof through which a needle valve member 25 projects. The needle valve member 25 is provided with a tubular body portion 26 slidably mounted within the sleeve-like member 23 and normally prevented from movement relative thereto by means of a coil spring 27 having the lower end thereof arranged within the tubular portion 26 of the valve member 25 and the upper end thereof bearing against an enlarged portion 28 which in turn is threadedly mounted within the upper end of the valve member 23. The enlarged portion 28 is disposed within the chamber 15 and is adapted to engage the annular shoulder 18 for limiting downward movement of the valve member 23. The arrangement is such that the bottom surface 29 of the valve member 23 will be spaced a substantial distance above the end wall of the reduced portion 17 at all times so as to be exposed to the pressure at the inlet opening 19.

In order to facilitate movement of the valve means 22 to its various positions of adjustment the inlet opening 19 communicates with the enlarged portion of the chamber through a passage 30, which as shown in Figure 2 opens into the chamber below the enlarged portion 28. Thus it will be seen that the lower surface of the enlarged portion 28, as well as the lower surface 29 of the valve member 23 will be exposed to the pressure at the inlet thereby assisting in opening the valve means.

As shown in Figure 2, the valve member 23 operates to control the passage of fluid through the by-pass 21, and the needle valve member 25 operates to control the flow of fluid through the outlet opening 20. The outlet 20 and the by-pass 21 are so arranged with respect to each other and the valve members 23 and 25 are so designed that when a predetermined pressure is exerted upon the surface 29, and upon the surface of the enlarged portion 28 through the passage 30 the valve means 22 will be moved upward sufficiently to retract the needle valve member 25 from its seat and thereby open communication to the burner. In this connection it is to be noted that the aforesaid pressure will not be sufficient to move the valve means upwardly to such an extent as to open the by-pass 21. However, upon an increase in pressure above the predetermined amount, the valve means 22 will be moved an additional amount to open the by-pass and permit the fluid to flow back into the supply tank.

The amount of pressure at the inlet necessary to move the valve to its several positions of adjustment is controlled by a coil spring 30' having one end engaging the enlarged portion 28 and the opposite end engaging a member 31. The member 31 is adjustably supported within the enlarged portion 16 of the chamber by means of an adjustable element 32 threadedly mounted within the cap 33 which in turn is secured to the upper end of the casing 14 for closing the latter. Thus it will be apparent that movement of the valve means 22 to a position wherein either or both the outlet 20 and by-pass 21 are open is opposed by the coil spring 30', and that the amount of pressure necessary to move the valve means 22 to its various positions of adjustment may be accurately regulated by adjusting the tension of the spring 30'.

For preventing the fluid flowing through the passage 30 from exerting a pressure upon the top side of the enlarged portion 28 so as to assist the spring in its function, I provide a flexible chamber 35 surrounding the spring 30' and having its lower end secured in any suitable manner to the enlarged portion 28 and its upper end secured to the annular disc member 36 which in turn is clamped between the top of the casing and the cap. With this arrangement it will be apparent that the fluid entering the enlarged portion of the chamber will be prevented from exerting a downward pressure upon the valve means.

The bellows 35 constitutes a single diaphragm means which is pressure responsive and adapted to control the burner outlet port and the by-pass port. As the fuel inlet port is always open, the bellows diaphragm is constantly responsive to fuel under pressure from the pump, and the valves are opened when suitable pressure is generated by the pump and closed when the pump stops and the fuel pressure drops.

The use of a flexible member in the manner set forth above offers the possibility of incorporating both the piston and needle valve in one unit owing to its comparatively long valve stem travel. This results in a regulator which is comparatively simple and compact in construction and one which requires but one adjustment.

Referring now to the modified form of construction shown in Figure 3, it will be noted that the only material difference between the valve illustrated in the above figure and the one previously described is that the valve means 37 in the modified form of the invention is of one piece construction. The valve means 37 comprises a body portion 38 slidably engaging the side walls of the reduced portion 39 and adapted to control communication through the by-pass opening 40. The body portion terminates at its lower end in a needle valve member 41 adapted to engage within the outlet opening 42 for closing the same and terminates at its upper end in an annular flange 43. The remaining parts of the valve illustrated in Figure 3 are substantially identical to the corresponding parts in the previously described form of the invention and the valve operates in substantially the same manner to regulate the pressure of the fluid flowing through the outlet opening.

In this form of the valve the needle valve 41 strikes its seat, but the flange 43 has a clearance with respect to shoulder 18, as will be apparent from Fig. 3. The shoulder 18 can only be used as a stop surface to limit expansion of the bellows, when the needle valve is movably mounted so that it can seat independently of the piston valve.

It should be understood that the terms piston valve and needle valve as used throughout the present specification and claims are equally applicable to the structures of Figs. 2 and 3; that is, the device may be considered to have two valve members, whether they be made of one integral piece, as shown in Fig. 3, or of several parts, or whether the needle valve 25 be movably supported with respect to the piston valve 23 of Fig. 2 or fixedly supported, as shown in Fig. 3.

The operation of the fuel system and regulator valve is as follows: Assuming that the oil burner is shut down, the parts of the valve of Fig. 2 will be in the position shown in Fig. 2, with the needle valve 25 closing the burner port 20, and the piston valve 23 closing the by-pass port 21. The parts are urged to this position by the action of the spring 30', the pressure of which is adjusted by the screw 32.

When the oil burner is started up, either manually or by any appropriate controlling devices, such as a thermostat, the motor, which usually actuates the pump and the air blower, soon builds up to its running speed. The oil pump 13, which has a residue of oil in it, when constructed as shown in Fig. 1, with its intake and outlet ports pointing upward, immediately begins to pump oil from the fuel supply 10, the fuel being conducted to the chamber 17 of the regulator valve 11. As the pump builds up pressure, due to the forcing of liquid fuel into this valve chamber, the fluid pressure acts upon the end of the piston 23 and upon the end of the bellows diaphragm 35. Fluid under pressure has access to the diaphragm through the bore 30 or some other appropriate conduit, and it tends to cause the bellows to retract, drawing with it the needle valve 25 and piston valve 23.

The burner port 20 is first opened by the needle valve at the predetermined pressure for which the regulator valve is set, and thereafter further movement of the piston 23 opens the by-pass port 21.

The opening of the by-pass port 21 depends upon the amount of fuel forced into the chamber 17, which cannot be discharged through the burner port 20, and all excess fuel is by-passed through the port 21. Should there be some momentary obstruction in the burner nozzle or burner port 20, the by-pass 21 is adapted to permit more liquid fuel to be by-passed, and all of the by-passed fuel is conducted back to the tank 10 by the pipe 13'.

When the burner motor is shut down, the motor soon coasts to a position of rest, and the pressure generated by the pump 13 decreases in the valve chamber 17. Then the by-pass port 21 is closed by the piston valve 23, and as the piston valve descends, the needle valve next closes the burner port 21.

The operation of the modification of Fig. 3 is the same as that of Fig. 2, except that in Fig. 2 the piston 23 may descend until the flange 28 strikes the stop surface 18 and the needle valve 25 is movably mounted so that it may seat independently of the piston 23. This assures a better seating of the needle valve 25 with respect to its port 20, irrespective of the piston 23.

It will thus be observed that I have invented an improved fuel regulator valve which has a single diaphragm means controlling two valve members in succession. My regulator valve is not subject to the uncertainties of action which were present in the piston actuated devices, but, on the contrary, it is positive and certain in its action, and gives a quick cut-off of the burner port, without leakage.

While in describing the two forms of the invention particular stress has been placed upon the association thereof with oil burner systems, it should be understood that the regulators illustrated herein may be used with equal facility in connection with any system where it is desirable to control the pressure of the fluid supplied to the points of distribution.

What I claim as my invention is:

1. A pressure regulator including a casing having a chamber formed with an annular shoulder intermediate the ends thereof and with a reduced portion adjacent one end thereof, said reduced portion being provided with an inlet opening connected to a pressure line and having a by-pass opening and an outlet opening, valve means slidably mounted within the reduced portion and operable to normally close both said outlet and by-pass openings, an enlarged portion carried by the valve means within the enlarged portion of the chamber and engageable with the shoulder therein for restricting movement of the valve means within the reduced portion of the chamber, said enlarged portion upon the valve means being exposed to the pressure at the inlet and operable upon a predetermined pressure to actuate the valve means for opening the outlet and upon an increase in pressure over the predetermined amount to effect a further actuation of the valve means to open said by-pass opening, and resilient means arranged within the enlarged portion of the chamber and engageable with the enlarged portion of the valve means for normally resisting opening of said by-pass and outlet.

2. A pressure regulator including a casing having a chamber therein provided with an inlet connected to a pressure line and having an outlet opening therein, said chamber further having a by-pass opening spaced inwardly from the outlet opening and in alignment with said inlet, valve means arranged within the chamber for controlling the outlet and by-pass openings, means carried by the valve means exposed to the pressure of the inlet and operable upon a predetermined pressure to move the valve means a sufficient distance to open said outlet and upon an increase in pressure over the predetermined amount to effect a further movement of the valve means to open said by-pass, resilient means bearing upon the last mentioned means for normally opposing movement of the valve means to open said by-pass and outlet, and means for preventing the fluid under pressure from assisting said resilient means in its function.

3. A pressure regulator including a casing having an enlarged portion and a reduced portion communicating therewith and forming an annular shoulder, said reduced portion being provided with an inlet opening connected to a pressure line and having an outlet and a by-pass opening therein, valve means slidably mounted within the reduced portion aforesaid and normally maintaining said by-pass and outlet closed, said valve means having an annular flanged portion arranged within the enlarged portion of the chamber and adapted to seat upon the annular shoulder aforesaid for limiting movement of the valve means toward closed position, said flanged portion being exposed to the pressure at the inlet and operable upon a predetermined pressure to move the valve means slightly to open the outlet and upon an increase of pressure to effect a further movement of the valve means to open the by-pass, resilient means arranged within the enlarged portion of the chamber and bearing upon the flanged portion aforesaid for varying the pressure at which said valve means is adapted to operate, and a flexible chamber carried by the flanged portion and housing said resilient means.

4. A pressure regulator including a casing having an enlarged portion and a reduced portion communicating therewith, said reduced portion being provided with an inlet opening connected to a pressure line and having an outlet and a by-pass opening therein, valve means slidably mounted within the reduced portion aforesaid and normally maintaining said by-pass and outlet closed, said valve means having an annular flanged portion arranged within the enlarged portion of the chamber, said flanged portion being exposed to the pressure at the inlet and operable upon a predetermined pressure to move the valve means slightly to open the outlet and upon an increase of pressure to effect a further movement of the valve means to open the by-pass, resilient means arranged within the enlarged portion of the chamber and bearing upon the flanged portion aforesaid for varying the pressure at which said valve means is adapted to operate, and a flexible chamber carried by the flanged portion and housing said resilient means.

5. A pressure regulator including a casing having a chamber formed with an annular reduced portion provided with an inlet opening in one side wall connected to a pressure line and a by-pass opening in the opposite side wall in alignment with said inlet, said reduced portion also having an outlet opening in an end wall thereof, valve means slidably mounted within the reduced portion and operable to normally close both said inlet and by-pass and having longitudinally spaced areas arranged respectively in said chamber and the reduced portion thereof, said areas being exposed to the pressure at the inlet end operable upon a predetermined pressure to open the outlet opening and upon an increase of pressure over the predetermined amount to open said by-pass.

6. A pressure regulator including a casing having spaced communicating portions, each provided with an inlet opening communicating with a common source of fluid under pressure, one of said portions having an outlet opening, means normally closing communication between the inlet opening in the latter portion and the outlet opening therein including a piston valve mounted for reciprocation within the last-mentioned portion between the inlet openings aforesaid and having an area exposed to the source of fluid under pressure discharged from the inlet opening in said last-mentioned portion for moving the valve to a position wherein communication is established between the latter inlet opening and outlet opening, said piston valve having another area extending into the other portion of said casing beyond the inlet opening therein with the inner surface thereof in the path of the fluid discharged by the latter opening for cooperating with the area aforesaid to actuate said valve, and means for preventing the fluid under pressure discharged against the inner surface of the second named area of the valve from reacting upon the outer side of said latter area.

7. A pressure regulator including a casing having spaced communicating chambers, one of said chambers having an inlet opening therein communicating with a source of fluid under pressure and having an outlet opening spaced from said inlet opening, means for controlling communication between the inlet and outlet openings including a piston valve reciprocably mounted in the latter chamber, said valve having a portion exposed to the fluid pressure discharged by said inlet opening and having a portion extending into the other of said chambers, and means for building up a pressure in said last-mentioned chamber around the portion of the valve projecting into the same substantially equal to the fluid pressure in said first-mentioned chamber so as to prevent fluid discharged by said inlet opening against the first-named portion of the valve from escaping past the latter into said second-mentioned chamber.

8. A pressure regulator including a casing having spaced communicating chambers, each having an inlet opening therein communicating with a common source of fluid under pressure, one of said chambers having an outlet opening and a by-pass opening therein, means normally closing both said outlet and by-pass openings including a piston valve reciprocably mounted in the chamber aforesaid between the inlet openings, said valve having a portion located within the other chamber in the path of the fluid under pressure discharged by the inlet opening in the latter chamber and having another portion exposed to the fluid under pressure discharged by the inlet opening in said first-mentioned chamber, both of said portions cooperating upon the exertion of a predetermined pressure thereon to open the outlet opening and upon an increase in pressure over the predetermined amount to open said by-pass.

9. A pressure regulator including a casing having a chamber therein provided with a reduced extension, both said chamber and extension having inlet openings communicating with a common source of fluid under pressure and said extension further having an outlet opening and a by-pass opening, means controlling the flow of fluid under pressure from the inlet opening in said extension to the outlet and by-pass openings therein including a piston valve reciprocably mounted in said extension and normally closing said inlet and by-pass openings, said valve having a portion projecting into said chamber in the path of travel of the fluid under pressure discharged by the inlet opening in said chamber and having another portion exposed to the fluid under pressure discharged from the inlet opening in said extension, both of said portions cooperating upon a predetermined pressure to open the outlet opening and upon an increase in pressure over the said predetermined amount to open the by-pass opening, yieldable means disposed in said chamber and acting upon the outer face of the portion of the valve in the chamber tending to maintain the valve in its normal position, and an expansible chamber encircling the yieldable means for preventing the fluid under pressure in said chamber from acting upon the outer face of said valve.

10. A pressure regulator including a casing having spaced communicating chambers, each provided with an inlet opening communicating with a common source of fluid under pressure and one of said chambers having an outlet opening, means for controlling the flow of fluid from the inlet opening in the latter chamber through the said outlet opening including a piston valve mounted for reciprocation between the inlet openings aforesaid, said valve comprising a tubular part having a portion exposed to the pressure of the fluid discharged by the inlet opening in the first-named chamber and having another portion extending within the other chamber and exposed to the pressure of the fluid discharged by the inlet opening therein, and a valve member slidably mounted within the tubular part aforesaid and normally yieldably urged into sealing engagement with the outlet opening.

11. A pressure regulator including a casing having spaced communicating chambers, each of said chambers having inlet openings communicating with a common source of fluid under pressure and one of said chambers having an outlet opening therein, means normally closing communication between the inlet and outlet openings in the latter chamber including a piston valve mounted for reciprocation within the last named chamber between the inlet openings aforesaid and having a portion exposed to the fluid under pressure discharged from the inlet opening in said last named chamber for actuating the valve, said piston valve having another portion extending into the other chamber of the casing beyond the inlet opening therein with the inner surface thereof in the path of the fluid discharged by the latter opening for cooperating with the first named portion of the valve to actuate the latter, said second mentioned portion of the valve having the marginal edges thereof spaced from the adjacent walls of the second named chamber permitting fluid under pressure from the source of supply to flow into the latter chamber to build up a pressure therein, and means for preventing the fluid discharged in the second chamber from reacting upon the outer side of the second portion aforesaid of the piston valve.

12. A fluid control device comprising a body having a pressure chamber, a port for the admission of fluid under pressure to said chamber, an outlet port and a by-pass port for returning excess liquid, a valve in the outlet port and a valve in the by-pass port, and single flexible diaphragm means for controlling both of said ports to permit the fluid to be passed through the outlet port and the excess returned to the source.

13. A control valve for oil burners comprising a body having an oil pressure chamber, a port for the admission of fluid under pressure from a supply tank, a port for the burner and a by-pass port for returning excess liquid to the supply tank, a valve in the burner port and a valve in the by-pass port, and single flexible diaphragm means controlling said valves whereby the oil is admitted to the burner port and the excess returned to the supply tank.

14. A fluid pressure regulator comprising a supporting body formed with a pressure chamber, said chamber having an inlet port for admission of fluid under pressure to said pressure chamber, an outlet port for discharge of fluid at predetermined pressure, a by-pass port for returning excess fluid to relieve the excess pressure in said chamber, an outlet valve controlling egress of fluid from said outlet port, a by-pass valve controlling egress of fluid from said by-pass port, and single flexible diaphragm means forming a movable wall of said pressure chamber and constantly responsive to the fluid pressure from said inlet port whereby the diaphragm is actuated when pressure is generated in said inlet port to move said valves from closed position and for controlling both said outlet valve and said by-pass valve to regulate the pressure of liquid discharged from said outlet port by discharging the excess fluid from said by-pass port.

15. A fluid pressure regulator comprising a supporting body formed with a pressure chamber, said chamber having an inlet port for admission of fluid under pressure to said pressure chamber, an outlet port for discharge of fluid at predetermined pressure, a by-pass port for returning excess fluid to relieve the excess pressure in said chamber, an outlet valve controlling egress of fluid from said outlet port, a by-pass valve controlling egress of fluid from said by-pass port, and single flexible diaphragm means forming a movable wall of said pressure chamber and responsive to the fluid pressure from said inlet port for controlling both said outlet valve and said by-pass valve to regulate the pressure of liquid discharged from said outlet port by discharging the excess liquid from said by-pass port, said outlet and by-pass valves having their valve surfaces so arranged with respect to said outlet and by-pass ports that said outlet valve is opened first and closed last in point of time with respect to the opening and closing respectively of said by-pass valve.

16. In a pressure regulator for oil burners, the combination of a supporting body formed with a pressure chamber, said chamber having an inlet port for admission of liquid fuel under pressure to said chamber, an outlet port for discharge of liquid fuel at predetermined pressure to the burner, a by-pass port for returning excess liquid fuel to a supply tank, an outlet valve controlling the discharge of liquid fuel from said outlet port, a by-pass valve for controlling the discharge of liquid fuel from said by-pass port, an extensible bellows having one end movable and the other end secured to the wall of said chamber whereby said bellows is responsive to the pressure in said chamber, and operative mechanical connecting means between said bellows and said valves whereby said valves are adapted to be actuated in succession by the same bellows to discharge liquid at predetermined pressure at said outlet port and by-pass the excess liquid through said by-pass port, to maintain said predetermined pressure.

17. In a pressure regulator for oil burners, the combination of a supporting body formed with a pressure chamber, said chamber having an inlet port for admission of liquid fuel under pressure to said chamber, an outlet port for discharge of liquid fuel at predetermined pressure to the burner, a by-pass port for returning excess liquid fuel to a supply tank, an outlet valve controlling the discharge of liquid fuel from said outlet port, a by-pass valve for controlling the discharge of liquid fuel from said by-pass port, an extensible bellows having one movable end and the other end secured to the wall of said chamber whereby said bellows is responsive to the pressure in said chamber, and operative mechanical connecting means between said bellows and said valves whereby said valves are adapted to be actuated in succession by the same bellows to discharge liquid at predetermined pressure at said outlet port and by-pass the excess liquid through said by-pass port to maintain said predetermined pressure, said bellows being located in said chamber to be responsive to inlet pressure at all times and to effect automatic closing or opening of the valves responsive to admission of liquid under pressure at the inlet port.

18. In a pressure regulator for oil burners, the combination of a supporting body formed with a pressure chamber, said chamber having an inlet port for admission of liquid fuel under pressure to said chamber, an outlet port for discharge of liquid fuel at predetermined pressure to the burner, a by-pass port for returning excess liquid fuel to a supply tank, an outlet valve controlling the discharge of liquid fuel from said outlet port, a by-pass valve for controlling the discharge of liquid fuel from said by-pass port, an extensible bellows having one movable end and the other end secured to the wall of said chamber whereby said bellows is responsive to the pressure in said chamber, and a coil spring located in said bellows, one end of said spring reacting against said body, and the other end engaging the movable end of said bellows and tending to urge said valves into closed position.

19. In a pressure regulator for oil burners, the combination of a supporting body formed with a pressure chamber, said chamber having an inlet port for admission of liquid fuel under pressure to said chamber, an outlet port for discharge of liquid fuel at predetermined pressure to the burner, a by-pass port for returning excess liquid fuel to a supply tank, an outlet valve controlling the discharge of liquid fuel from said outlet port, a by-pass valve for controlling the discharge of liquid fuel from said by-pass port, an extensible bellows having one movable end and the other end secured to the wall of said chamber whereby said bellows is responsive to the pressure in said chamber, operative mechanical connecting means between said bellows and said valves whereby said valves are adapted to be actuated in succession by the same bellows to discharge liquid at predetermined pressure at said outlet port and by-pass the excess liquid through said by-pass port to maintain said predetermined pressure, a coil spring located in said bellows, one end of said spring reacting against said body, and the other end engaging the closed end of said bellows and tending to urge said valves into closed position, and adjustable threaded means for supporting the first-mentioned end of said spring to predetermine the pressure at which said outlet valve operates.

20. In a pressure regulator for oil burners, the combination of a supporting body formed with a pressure chamber, said chamber having an inlet port for admission of liquid fuel under pressure to said chamber, an outlet port for discharge of liquid fuel at predetermined pressure to the burner, a by-pass port for returning excess liquid fuel to a supply tank, an outlet valve controlling the discharge of liquid fuel from said outlet port, a by-pass valve for controlling the discharge of liquid fuel from said by-pass port, an extensible bellows having one end closed and the other end secured to the wall of said chamber whereby said bellows is responsive to the pressure in said chamber, a part of said body being formed with a cylindrical bore communicating with said by-pass bore and said valves comprising a valve body carried by the closed end of said bellows and having a cylindrical part slidably mounted in said bore to form a piston by-pass valve, and said second valve being carried by said body for controlling said outlet port, said valves being actuated successively by said bellows.

21. In a pressure regulator for oil burners, the combination of a supporting body formed with a pressure chamber, said chamber having an inlet port for admission of liquid fuel under pressure to said chamber, an outlet port for discharge of liquid fuel at predetermined pressure to the burner, a by-pass port for returning excess liquid fuel to a supply tank, an extensible bellows having one end closed and the other end secured to the walls of said chamber whereby said bellows is responsive to the pressure in said chamber, a piston valve carried by the closed end of said bellows and having a cylindrical surface, said body being provided with a cylindrical bore communicating with said by-pass port and adapted to slidably receive said piston valve, and a second valve carried by said piston and comprising a needle valve having a conical portion for closing the outlet port, the piston having its port uncovering edge located at a distance from the by-pass port, which distance is greater than the range of movement required to open the outlet valve, whereby the outlet valve is opened first and the by-pass valve is opened second.

22. An automatic valve comprising a casing for containing a liquid, a liquid inlet, outlet and by-pass in communication with the casing, a bellows member fixed at one end located within the casing adapted to move under action of liquid pressure, a cut-off valve cooperating with the bellows member adapted to close the outlet at a predetermined pressure within the casing and to open the outlet at a predetermined higher pressure, an automatic by-pass valve cooperating with the yielding member for regulating the liquid pressure in the casing, a spring cooperating with the bellows member in opposed relation to the liquid pressure for regulating the action of the cut-off and by-pass valves.

23. An automatic valve comprising a casing for containing a liquid, a liquid inlet, outlet and by-pass in communication with the casing, a yielding bellows member fixed at one end located within the casing adapted to move under action of liquid pressure, a cut-off valve cooperating with the yielding bellows member adapted to close the outlet at a predetermined pressure within the casing and to open the outlet at a predetermined high pressure, an automatic by-pass valve cooperating with the yielding bellows member for regulating the liquid pressure in the casing, a spring cooperating with the yielding bellows member in opposed relation to the liquid pressure for regulating the liquid pressure in the chamber and also the pressure at which the cut-off valve closes the outlet for stopping the flow of liquid from said outlet.

MILTON A. POWERS.